United States Patent
Matsui

(10) Patent No.: US 12,448,567 B2
(45) Date of Patent: Oct. 21, 2025

(54) METHOD FOR REMOVING METAL COMPOUND

(71) Applicant: SHOWA DENKO K.K., Tokyo (JP)

(72) Inventor: Kazuma Matsui, Tokyo (JP)

(73) Assignee: Resonac Corporation, Tokyo (JP)

( * ) Notice: Subject to any disclaimer, the term of this patent is extended or adjusted under 35 U.S.C. 154(b) by 20 days.

(21) Appl. No.: 17/611,607

(22) PCT Filed: Jan. 12, 2021

(86) PCT No.: PCT/JP2021/000714
§ 371 (c)(1),
(2) Date: Nov. 16, 2021

(87) PCT Pub. No.: WO2021/153220
PCT Pub. Date: Aug. 5, 2021

(65) Prior Publication Data
US 2022/0243128 A1    Aug. 4, 2022

(30) Foreign Application Priority Data
Jan. 30, 2020  (JP) .................................. 2020-013875

(51) Int. Cl.
C09K 13/00    (2006.01)
B08B 3/08    (2006.01)

(52) U.S. Cl.
CPC ............... C09K 13/00 (2013.01); B08B 3/08 (2013.01)

(58) Field of Classification Search
None
See application file for complete search history.

(56) References Cited

U.S. PATENT DOCUMENTS

| | | |
|---|---|---|
| 6,319,801 B1 | 11/2001 | Wake et al. |
| 11,499,236 B2 | 11/2022 | Ge et al. |
| 2005/0236362 A1 | 10/2005 | Aoki et al. |
| 2006/0199749 A1 | 9/2006 | Suzuki et al. |
| 2010/0112728 A1* | 5/2010 | Korzenski ......... H01L 21/02079 257/E21.294 |
| 2015/0175943 A1 | 6/2015 | Casteel, Jr. et al. |
| 2019/0284704 A1 | 9/2019 | Ge et al. |

FOREIGN PATENT DOCUMENTS

| | | | |
|---|---|---|---|
| EP | 2 322 692 A1 | 5/2011 | |
| EP | 3 040 409 A1 | 7/2016 | |
| EP | 3540764 A1 * | 9/2019 | ............ C09K 13/06 |
| JP | 3039493 B2 | 5/2000 | |
| JP | 2003-17458 A | 1/2003 | |
| JP | 2003-257922 A | 9/2003 | |
| JP | 2004-317991 A | 11/2004 | |
| JP | 2005-109318 A | 4/2005 | |
| JP | 2005-317636 A | 11/2005 | |
| JP | 2008-258395 A | 10/2008 | |
| JP | 2011-252220 A | 12/2011 | |
| JP | 2015-30809 A | 2/2015 | |
| JP | 2016-132701 A | 7/2016 | |
| JP | 2018-95907 A | 6/2018 | |
| JP | 6522957 B2 * | 5/2019 | ............ C09K 13/06 |
| KR | 10-2019-0109317 A | 9/2019 | |
| WO | 01/29284 A1 | 4/2001 | |

OTHER PUBLICATIONS

JP-6522957 English translation, accessed on Apr. 2023. (Year: 2019).*
International Preliminary Report on Patentability dated Jul. 28, 2022 with a Translation of the Written Opinion of the International Searching Authority in Application No. PCT/JP2021/000714, 5 Pages.
International Search Report dated Mar. 16, 2021 in Application No. PCT/JP2021/00714, 5 Pages.

* cited by examiner

*Primary Examiner* — Kaj K Olsen
*Assistant Examiner* — Arlyn I Rivera-Cordero
(74) *Attorney, Agent, or Firm* — Sughrue Mion, PLLC

(57) ABSTRACT

A method for removing a metal compound capable of selectively removing an oxide of a metal, a nitride of a metal, or an oxynitride of a metal while suppressing the removal of silicon dioxide, silicon nitride, polysilicon, a simple substance of a metal, or the like. The method includes bringing at least one metal compound selected from oxides of a metal, nitrides of a metal, and oxynitrides of a metal into contact with a treatment liquid to remove it from a treatment object. The metal is at least one selected from tungsten, cobalt, nickel, tantalum, titanium, iron, copper, and molybdenum. The treatment liquid is an aqueous solution containing at least one compound for removal selected from carboxylic acids and salts thereof and contains the compound(s) for removal at a total concentration of 2 mass % or more.

17 Claims, No Drawings

METHOD FOR REMOVING METAL COMPOUND

CROSS REFERENCE TO RELATED APPLICATIONS

This application is a National Stage of International Application No. PCT/JP2021/000714, filed Jan. 12, 2021, claiming priority to Japanese Patent Application No. 2020-013875, filed Jan. 30, 2020.

TECHNICAL FIELD

The present invention relates to a method for removing a metal compound.

BACKGROUND ART

In electronic devices such as liquid crystal displays and semiconductor elements, metals such as tungsten (W), cobalt (Co), nickel (Ni), tantalum (Ta), titanium (Ti), iron (Fe), copper (Cu), and molybdenum (Mo) are sometimes used as a wiring material, channel material, gate material, barrier metal, or the like.

In a step of using the aforesaid metal to form wiring or the like on an electric device, there may occur various types of contamination. Such contamination may cause the occurrence of a leakage current and therefore become a cause of manufacturing an electronic device having deteriorated characteristics. Examples of the contamination include, in a step of forming a nitride film or oxide film during the manufacture of an electronic device, formation of a contaminant such as metal oxide, metal nitride, or metal oxynitride and formation of a contaminant such as metal oxide, metal nitride, or metal oxynitride as a result of mixing of the air in a chamber to be used during the manufacture of the electronic device and causing a reaction of oxygen and nitrogen with a metal film.

In order to remove the contaminant such as metal oxide on the electronic device because of the aforesaid reason, the electronic device is subjected to a washing treatment with a treatment liquid. In a semiconductor manufacturing step for manufacturing a semiconductor with silicon as a substrate, for example, a solution containing a fluorine compound or a fluoride ion-containing compound, a mixed solution of aqueous hydrogen peroxide and aqueous ammonia (refer to, for example, PTL 1), or a mixed solution obtained by adding a chelating agent to an aqueous carboxylic acid solution (refer to, for example, PTL 2) is used as a treatment liquid for removing the aforesaid contaminants.

CITATION LIST

Patent Literature

PTL 1: JP 2004-31791 A
PTL 2: Japanese Patent No. 3039493

SUMMARY OF INVENTION

Technical Problem

However, the treatment liquid containing a fluorine compound or a fluoride ion-containing compound contains fluorine, so that it has a problem of simultaneously removing a silicon substrate, a silicon dioxide film, or the like. In addition, the treatment liquid disclosed in PTL 1 contains an oxidizing agent, so that it has a problem of simultaneously removing a simple substance of a metal such as a simple substance of tungsten or a simple substance of titanium.

PTL 2 discloses that a contaminant metal such as iron can be removed using an aqueous oxalic acid solution having a concentration of 1%. It however does not disclose a method of removing a metal oxide, a metal nitride, or a metal oxynitride with higher selectivity than a simple substance of a metal.

An object of the present invention is to provide a method of removing a metal compound capable of selectively removing an oxide of a metal, a nitride of a metal, or an oxynitride of a metal while suppressing the removal of silicon dioxide, silicon nitride, polysilicon, a simple substance of a metal, or the like.

Solution to Problem

With a view to achieving the aforesaid object, the present invention has the following [1] to [16] as one aspect.

[1] A method for removing a metal compound, including bringing at least one metal compound selected from oxides of a metal, nitrides of a metal, and oxynitrides of a metal into contact with a treatment liquid to remove the metal compound from a treatment object, wherein:
the metal is at least one selected from tungsten, cobalt, nickel, tantalum, titanium, iron, copper, and molybdenum,
the treatment liquid is an aqueous solution containing at least one compound for removal selected from carboxylic acids and salts of the carboxylic acids, and
the treatment liquid contains the compound(s) for removal at a total concentration of 2 mass % or more.

[2] The method for removing a metal compound as described in [1], wherein the treatment liquid contains the compound(s) for removal at a total concentration of 3 mass % or more and 70 mass % or less.

[3] The method for removing a metal compound as described in [1], wherein the treatment liquid contains the compound(s) for removal at a total concentration of 5 mass % or more and 50 mass % or less.

[4] The method for removing a metal compound as described in any of [1] to [3], wherein the carboxylic acids are polycarboxylic acids.

[5] The method for removing a metal compound as described in any of [1] to [3], wherein the carboxylic acids are α-hydroxycarboxylic acids.

[6] The method for removing a metal compound as described in any of [1] to [3], wherein the carboxylic acids are α-amino acids.

[7] The method for removing a metal compound as described in any of [1] to [3], wherein the carboxylic acids are at least one selected from citric acid, tartaric acid, succinic acid, malic acid, glutaric acid, lactic acid, and glycine.

[8] The method for removing a metal compound as described in any of [1] to [7], wherein the compound for removal contains at least one selected from ammonium salts of the carboxylic acids, sodium salts of the carboxylic acids, and potassium salts of the carboxylic acids.

[9] The method for removing a metal compound as described in any of [1] to [8], wherein the treatment liquid has a pH at 25° C. of 1 or more and 9 or less.

[10] The method for removing a metal compound as described in any of [1] to [9], wherein the treatment liquid has a temperature of 0° C. or more and 100° C. or less.

[11] The method for removing a metal compound as described in any of [1] to [10], wherein a contact time between the metal compound and the treatment liquid is 1 second or more to 60 minutes or less.

[12] The method for removing a metal compound as described in any of [1] to [11], wherein a ratio of a removal rate of the metal compound as a removal object to a removal rate of a non-removal object is 10 or more and the non-removal object is at least one selected from silicon dioxide, silicon nitride, polysilicon, a simple substance of tungsten, a simple substance of cobalt, a simple substance of nickel, a simple substance of tantalum, a simple substance of titanium, a simple substance of iron, a simple substance of copper, and a simple substance of molybdenum.

[13] The method for removing a metal compound as described in any of [1] to [12], wherein the metal compound is a contaminant for an electronic device.

[14] The method for removing a metal compound as described in any of [1] to [13], wherein the treatment liquid contains a fluoride ion at a concentration of 1 mass % or less.

[15] The method for removing a metal compound as described in any of [1] to [14], wherein the treatment liquid contains an oxidizing agent at a concentration of 1 mass % or less.

[16] The method for removing a metal compound as described in [15], wherein the oxidizing agent is hydrogen peroxide.

Advantageous Effects of Invention

The present invention makes it possible to selectively remove oxides of a metal, nitrides of a metal, or oxynitrides of a metal while suppressing the removal of silicon dioxide, silicon nitride, polysilicon, a simple substance of a metal, and the like.

DESCRIPTION OF EMBODIMENTS

One embodiment of the present invention will next be described. The present embodiment shows one example of the present invention and the present invention is not limited to or by the present embodiment. The present embodiment may be modified or improved variously and such modified or improved ones may be embraced in the present invention.

As a result of various studies, the present inventors have found that the aforesaid object can be achieved by treating with a treatment liquid having a specific constitution and completed the present invention. Described specifically, the method for removing a metal compound according to one embodiment of the present invention is a method for removing a metal compound including a removal step, that is, a step of bringing at least one metal compound selected from oxides of a metal, nitrides of a metal, and oxynitrides of a metal into contact with a treatment liquid to remove it from a treatment object. The aforesaid metal is at least one selected from tungsten, cobalt, nickel, tantalum, titanium, iron, copper, and molybdenum. The treatment liquid is an aqueous solution containing at least one compound for removal selected from carboxylic acids and salts thereof and the treatment liquid contains the compound(s) for removal at a total concentration of 2 mass % or more.

The carboxylic acids and salts thereof have a chelating action on oxides, nitrides, and oxynitrides of the aforesaid metal, so that treatment with the aforesaid treatment liquid can selectively remove the oxides, nitrides, and oxynitrides of the aforesaid metal while suppressing the removal of silicon dioxide, silicon nitride, polysilicon, a simple substance of a metal, and the like.

For example, when a metal film (a film made of a simple substance of a metal) is formed on a substrate for the manufacture of an electronic device such as liquid-crystal display or semiconductor element, the metal film reacts with oxygen or nitrogen mixed in and a contaminant such as oxide of the metal, nitride of the metal, or oxynitride of the metal may stick to the substrate. By applying the method for removing a metal compound according to the present embodiment to the substrate to which the contaminant has stuck, the compound for removal in the treatment liquid forms a complex with the oxide of the metal, nitride of the metal, or oxynitride of the metal by a chelating action, so that the contaminant which has stuck to the substrate can be removed.

On the other hand, compared with the oxide of the metal, nitride of the metal, or oxynitride of the metal, the simple substance of a metal constituting the metal film requires long hours for the formation of a chelate with the compound for removal, so that the metal film is scarcely removed even by the contact with the treatment liquid. The same is true for a silicon dioxide film, silicon nitride film, or polysilicon film formed on the substrate and the silicon dioxide film, silicon nitride film, or polysilicon film is scarcely removed.

The terms "oxide of a metal", "nitride of a metal", and "oxynitride of a metal" mean a compound made of a metal and an oxygen atom (O), a compound made of a metal and a nitrogen atom (N), and a compound made of a metal, an oxygen atom, and a nitrogen atom, respectively. The respective forms of the oxide of a metal, the nitride of a metal, and the oxynitride of a metal are not particularly limited and they may be, for example, a film form, a foil form, a powder form, a particle form, or a lump form.

Although a ratio of the metal to an oxygen atom or a nitrogen atom in the metal compound is not particularly limited, the oxide of a metal is, for example, a compound represented by $M_xO_y$ (M is at least one metal selected from tungsten, cobalt, nickel, tantalum, titanium, iron, copper, and molybdenum, x is an integer of 1 or more and 5 or less, and y is an integer of 1 or more and 10 or less) and specific examples include compounds represented by MO, $M_2O_3$, $MO_2$, $MO_3$, $M_3O_4$, and $M_2O_5$.

The nitride of a metal is, for example, a compound represented by $M_aN_b$ (M is at least one metal selected from tungsten, cobalt, nickel, tantalum, titanium, iron, copper, and molybdenum, a is an integer of 1 or more and 20 or less, and b is an integer of 1 or more and 30 or less) and specific examples include compounds represented by MN, $M_2N$, $M_3N_2$, $M_3N_4$, $M_4N$, $M_7N_3$, and $M_{16}N_2$.

The oxynitride of a metal is, for example, a compound represented by $M_cN_dO_e$ (M is at least one metal selected from tungsten, cobalt, nickel, tantalum, titanium, iron, copper, and molybdenum and c, d, and e are each independently an integer of 1 or more). It is a compound containing the metal preferably in an amount of 10 mol % or more, more preferably 15 mol % or more, still more preferably 20 mol % or more.

The total concentration of the compound(s) for removal in the treatment liquid is 2 mass % or more, preferably 3 mass % or more and 70 mass % or less, more preferably 5 mass % or more and 50 mass % or less. When the total concentration of the compound(s) for removal in the treatment liquid falls within the aforesaid range, a removal rate of the aforesaid metal compound to be removed is high and is therefore more practical. An aqueous solution of the compound for removal is used as the treatment liquid, so that the compound for removal has preferably a high solubility (g/100 g-H$_2$O) in water, preferably 2 or more.

The kind of the compound for removal is not particularly limited as long as it is a carboxylic acid or salt thereof capable of forming a chelate complex with the aforesaid oxide of a metal, nitride of a metal, or oxynitride of a metal. Preferred examples include polycarboxylic acids, α-hydroxycarboxylic acids, and α-amino acids, or salts thereof.

The polycarboxylic acids are carboxylic acids having, in the molecule thereof, a plurality of carboxyl groups. The number of carboxyl groups is preferably 2 or 3 in consideration of the intensity of the chelating action. Specific examples of the polycarboxylic acids include citric acid, tartaric acid, malic acid, succinic acid, maleic acid, oxalic acid, malonic acid, glutaric acid, adipic acid, D-glucaric acid, itaconic acid, citraconic acid, mesaconic acid, 2-oxoglutaric acid, 3-oxoglutaric acid, acetylenedicarboxylic acid, 1,1-cyclopropanedicarboxylic acid, trimellitic acid, endothall, glutamic acid, methylsuccinic acid, citramalic acid, and phthalic acid.

The α-hydroxycarboxylic acid is a carboxylic acid having a hydroxyl group on a carbon atom adjacent to the carboxyl group. Specific examples of the α-hydroxycarboxylic acid include lactic acid, glycolic acid, tartronic acid, and quinic acid.

The α-amino acid is a carboxylic acid having an amino group on the carbon atom adjacent to the carboxyl group. Specific examples of the α-amino acid include glycine, alanine, arginine, asparagine, aspartic acid, glutamine, glutamic acid, valine, leucine, isoleucine, cysteine, histidine, lysine, serine, threonine, tryptophan, phenylalanine, proline, tyrosine, and lysine.

Of these carboxylic acids, from the standpoint of handling ease and high effectiveness in removing the metal compound, citric acid, tartaric acid, malonic acid, 2-oxoglutaric acid, 3-oxoglutaric acid, glutaric acid, endothall, glycolic acid, malic acid, oxalic acid, phthalic acid, lactic acid, glycine, and alanine are more preferred, with citric acid, tartaric acid, succinic acid, malic acid, glutaric acid, lactic acid, and glycine being still more preferred.

When a salt of the carboxylic acid is used as the compound for removal, the kind of the salt is not particularly limited. Examples include ammonium salts, alkyl ammonium salts, aryl ammonium salts, lithium salts, sodium salts, potassium salts, cesium salts, calcium salts, and magnesium salts. From the standpoint of high safety, handling ease, and economy, ammonium salts, alkyl ammonium salts, lithium salts, sodium salts, potassium salts, and cesium salts are more preferred, with ammonium salts, sodium salts, and potassium salts being still more preferred. By mixing a carboxylic acid, a base, and water, an aqueous solution of a salt of the carboxylic acid can be obtained.

The carboxylic acids may be used either singly or two or more of them may be used in combination. As the compound for removal, only the carboxylic acid may be used, the salt of the carboxylic acid may be used, or the carboxylic acid and the salt thereof may be used in combination. Further, the salts of the carboxylic acid may be used either singly or two or more of them may be used in combination.

The treatment liquid may contain a component other than the carboxylic acid or salt thereof. For example, it may contain a humectant, a surfactant, a colorant, an antifoaming agent, or the like. However, the treatment liquid preferably contains neither an oxidizing agent such as hydrogen peroxide nor a fluoride ion. The respective concentrations of the oxidizing agent and the fluoride ion in the treatment liquid are preferably 1 mass % or less. Using the treatment liquid containing the oxidizing agent or fluoride ion may remove not only the metal compound but also the simple substance of a metal, silicon dioxide, polysilicon, or the like.

In the method for removing a metal compound according to the present embodiment, the method of bringing the metal compound into contact with the treatment liquid is not particularly limited but examples include methods such as dipping, spraying, application, and pouring. Of these, the dipping method is preferred from the standpoint of simplifying an apparatus to be used for bringing the metal compound into contact with the treatment liquid.

Although the treatment conditions in the dipping method differ depending on the kind of the metal or the composition of the treatment liquid, the pH at 25° C. of the treatment liquid is preferably 1 or more and 9 or less, more preferably 7 or more and 9 or less. The pH at 25° C. of the treatment liquid can be regulated by mixing it with a basic aqueous solution such as aqueous ammonia.

The temperature of the treatment liquid is preferably 0° C. or more and 100° C. or less, more preferably 5° C. or more and 90° C. or less, still more preferably 10° C. or more and 80° C. or less. The contact time (treatment time) between the metal compound and the treatment liquid is preferably 0.1 second and more and 180 minutes or less, more preferably 0.5 second or more and 90 minutes or less, still more preferably 1 second or more and 60 minutes or less.

Such a dipping treatment may be performed only by dipping a treatment object (such as substrate) having the aforesaid metal compound to be removed in the treatment liquid but it may also be performed by dipping it in the treatment liquid subjected to application of ultrasonic waves or stirring.

The compound for removal or the contaminant which has remained on the surface of the treatment object can be removed from the treatment object by washing the treatment object with a washing liquid such as water after the metal compound-removing treatment. Although the kind of the washing liquid is not particularly limited, washing may be performed only with water such as pure water. Use of an organic solvent such as alcohol is not required. Since there is no need of using an organic solvent for the treatment liquid or washing liquid, the method for removing a metal compound according to the present embodiment is not likely to adversely affect the human body or environment.

Although the kind of the treatment object to which the method for removing a metal compound according to the present embodiment can be applied is not particularly limited as long as it has the metal compound, which is a removal object, and has a non-removal object which will be described later, examples include electronic devices. Specific examples of the electronic devices include liquid crystal displays, semiconductor elements, MEMS (Micro Electro Mechanical Systems) elements, and hard disks. Silicon dioxide, silicon nitride, polysilicon, and a simple substance of a metal which are non-removal objects are scarcely removed by the method for removing a metal compound according to the present invention, so that the present method can remove the aforesaid metal compound, which is a contaminant of the electronic device, with almost no adverse effects on the treatment object such as electronic device.

In the method for removing a metal compound according to the present embodiment, a ratio of the removal rate of the aforesaid metal compound, which is a removal object, to the removal rate of a non-removal object, which is not a removal object, is preferably 10 or more. The term "non-removal object" as used herein means at least one selected from silicon dioxide, silicon nitride, polysilicon, simple substance of tungsten, simple substance of cobalt, simple substance of nickel, simple substance of tantalum, simple substance of titanium, simple substance of iron, simple substance of copper, and simple substance of molybdenum.

When the non-removal object is in film or foil form, its thickness is preferably 10 nm or more, more preferably 50 nm or more, still more preferably 100 nm or more. When it is in lump form, its short diameter is preferably 10 nm or more, more preferably 50 nm or more, still more preferably 100 nm or more. A too small non-removal object is sometimes removed by the aforesaid treatment liquid.

These non-removal objects are, for example, substances constituting an electronic device and they are substances used as a wiring material, channel material, gate material, or barrier metal in the electronic device. When the ratio of the removal rate is 10 or more, the aforesaid metal compound, which is a contaminant in the electronic device, can be removed selectively while suppressing the removal of the non-removal object such as silicon dioxide, silicon nitride, polysilicon, or a simple substance of the metal.

EXAMPLES

The present invention will hereinafter be described in further detail by Examples, Comparative Examples, and Referential Examples.

Example 1

A 100-mL polypropylene container containing 40 mL of a treatment liquid (an aqueous triammonium citrate solution (pH 7.6 at 25° C.) having a concentration of 5 mass %) was heated in a water bath to increase the temperature of the treatment liquid to 25° C. A removal step was performed by dipping a silicon substrate (product of KST WORLD) having a 600-nm thick tungsten oxide ($WO_3$) film formed thereon in the treatment liquid for 5 minutes and allowing it to stand. The silicon substrate had a shape of a 2-cm square and only a half portion of it, that is, a 1-cm long and 2-cm wide rectangular portion was dipped in the treatment liquid.

The silicon substrate was taken out from the treatment liquid and the entire silicon substrate including the portion dipped in the treatment liquid was washed with pure water. The removal rate of the portion of the tungsten oxide film dipped in the treatment liquid was determined by measuring a difference in film thickness between the portion of the tungsten oxide film dipped in the treatment liquid and the portion of the tungsten oxide film not dipped therein and dividing the difference in film thickness by the dipping time (treatment time). The difference in film thickness of the tungsten oxide film was measured with an atomic force microscope. The following are measurement conditions. The measurement results are shown in Table 1.

Atomic force microscope: VN-8010, product of Keyence

Measurement temperature: 28° C.

Measurement pressure: 101.3 kPa

Measurement atmosphere: air

Scan range: 80.0 μm in width, 20.0 μm in height, 0° in angle

TABLE 1

| | | Treatment liquid | | | Treatment time | Removal rate |
| | Kind of film | Composition | pH | Temperature (° C.) | (min) | (nm/min) |
| --- | --- | --- | --- | --- | --- | --- |
| Ex. 1 | Tungsten oxide | 5 Mass % triammonium citrate | 7.6 | 25 | 5 | 30 |
| Ex. 2 | Tungsten oxide | 5 Mass % triammonium citrate | 7.6 | 90 | 5 | 58 |
| Ex. 3 | Tungsten oxide | 5 Mass % triammonium citrate | 7.6 | 0 | 5 | 18 |
| Ex. 4 | Tungsten oxide | 50 Mass % triammonium citrate | 7.6 | 25 | 5 | 100 |
| Ex. 5 | Tungsten oxide | 2.5 Mass % citric acid, 1 mass % ammonia | 8.5 | 25 | 5 | 59 |
| Ex. 6 | Tungsten oxide | 3.33 Mass % citric acid, 0.67 mass % ammonia | 6.5 | 25 | 5 | 25 |
| Ex. 7 | Tungsten oxide | 4.17 Mass % citric acid, 0.33 mass % ammonia | 4.0 | 25 | 5 | 19 |
| Ex. 8 | Tungsten oxide | 5 Mass % trisodium citrate | 7.6 | 25 | 5 | 30 |
| Ex. 9 | Tungsten oxide | 5 Mass % tripotassium citrate | 7.6 | 25 | 5 | 27 |
| Ex. 10 | Tungsten oxide | 5 Mass % ammonium DL-tartrate | 7.9 | 25 | 5 | 25 |
| Ex. 11 | Tungsten oxide | 5 Mass % diammonium succinate | 8.0 | 25 | 5 | 37 |
| Ex. 12 | Tungsten oxide | 5 Mass % diammonium malate | 8.0 | 25 | 5 | 12 |
| Ex. 13 | Tungsten oxide | 5 Mass % diammonium glutarate | 8.0 | 25 | 5 | 12 |
| Ex. 14 | Tungsten oxide | 5 Mass % glycine | 8.0 | 60 | 5 | 7 |
| Ex. 15 | Tungsten oxide | 5 Mass % citric acid | 2.0 | 60 | 5 | 5 |
| Ex. 16 | Cobalt oxide | 5 Mass % triammonium citrate | 7.6 | 25 | 5 | 35 |
| Ex. 17 | Nickel oxide | 5 Mass % triammonium citrate | 7.6 | 25 | 5 | 39 |
| Ex. 18 | Molybdenum oxide | 5 Mass % triammonium citrate | 7.6 | 25 | 5 | 11 |
| Ex. 19 | Titanium oxide | 5 Mass % triammonium citrate | 7.6 | 25 | 5 | 32 |
| Ex. 20 | Iron oxide | 5 Mass % triammonium citrate | 7.6 | 25 | 5 | 49 |
| Ex. 21 | Copper oxide | 5 Mass % triammonium citrate | 7.6 | 25 | 5 | 51 |
| Ex. 22 | Tantalum oxide | 5 Mass % triammonium citrate | 7.6 | 60 | 5 | 8 |
| Ex. 23 | Tantalum oxide | 5 Mass % ammonium lactate | 7.8 | 40 | 5 | 21 |
| Ex. 24 | Tungsten nitride | 5 Mass % triammonium citrate | 7.6 | 60 | 5 | 8 |
| Ex. 25 | Tungsten oxynitride | 5 Mass % triammonium citrate | 7.6 | 60 | 5 | 14 |

Example 2

In a manner similar to that of Example 1 except that the temperature of the treatment liquid was changed to 90° C., the removal step was performed and the removal rate of the tungsten oxide film was determined. The results are shown in Table 1.

Example 3

In a manner similar to that of Example 1 except that the temperature of the treatment liquid was changed to 0° C., the removal step was performed and the removal rate of the tungsten oxide film was determined. The results are shown in Table 1.

Example 4

In a manner similar to that of Example 1 except that the concentration of triammonium citrate in the treatment liquid was changed to 50 mass %, the removal step was performed and the removal rate of the tungsten oxide film was determined. The results are shown in Table 1.

Example 5

In a manner similar to that of Example 1 except that an aqueous solution (pH 8.5 at 25° C.) obtained by mixing an aqueous citric acid solution having a concentration of 5 mass % and aqueous ammonia having a concentration of 2 mass % at a mass ratio of 1:1 was used as the treatment liquid, the removal step was performed and the removal rate of the tungsten oxide film was determined. It is to be noted that the treatment liquid used is an aqueous solution containing 2.5 mass % citric acid and 1 mass % ammonia. The results are shown in Table 1.

Example 6

In a manner similar to that of Example 1 except that an aqueous solution (pH 6.5 at 25° C.) obtained by mixing an aqueous citric acid solution having a concentration of 5 mass % and aqueous ammonia having a concentration of 2 mass % at a mass ratio of 2:1 was used as the treatment liquid, the removal step was performed and the removal rate of the tungsten oxide film was determined. It is to be noted that the treatment liquid used is an aqueous solution containing 3.33 mass % citric acid and 0.67 mass % ammonia. The results are shown in Table 1.

Example 7

In a manner similar to that of Example 1 except that an aqueous solution (pH 4.0 at 25° C.) obtained by mixing an aqueous citric acid solution having a concentration of 5 mass % and aqueous ammonia having a concentration of 2 mass % at a mass ratio of 5:1 was used as the treatment liquid, the removal step was performed and the removal rate of the tungsten oxide film was determined. It is to be noted that the treatment liquid used is an aqueous solution containing 4.17 mass % citric acid and 0.33 mass % ammonia. The results are shown in Table 1.

Example 8

In a manner similar to that of Example 1 except that an aqueous trisodium citrate solution (pH 7.6 at 25° C.) having a concentration of 5 mass % was used as the treatment liquid, the removal step was performed and the removal rate of the tungsten oxide film was determined. The results are shown in Table 1.

Example 9

In a manner similar to that of Example 1 except that an aqueous tripotassium citrate solution (pH 7.6 at 25° C.) having a concentration of 5 mass % was used as the treatment liquid, the removal step was performed and the removal rate of the tungsten oxide film was determined. The results are shown in Table 1.

Example 10

In a manner similar to that of Example 1 except that an aqueous diammonium DL-tartrate solution (pH 7.9 at 25° C.) having a concentration of 5 mass % was used as the treatment liquid, the removal step was performed and the removal rate of the tungsten oxide film was determined. The results are shown in Table 1.

Example 11

In a manner similar to that of Example 1 except that an aqueous diammonium succinate solution (pH 8.0 at 25° C.) having a concentration of 5 mass % was used as the treatment liquid, the removal step was performed and the removal rate of the tungsten oxide film was determined. The results are shown in Table 1.

Example 12

In a manner similar to that of Example 1 except that an aqueous diammonium malate solution (pH 8.0 at 25° C.) having a concentration of 5 mass % was used as the treatment liquid, the removal step was performed and the removal rate of the tungsten oxide film was determined. The results are shown in Table 1.

Example 13

In a manner similar to that of Example 1 except that an aqueous diammonium glutarate solution (pH 8.0 at 25° C.) having a concentration of 5 mass % was used as the treatment liquid, the removal step was performed and the removal rate of the tungsten oxide film was determined. The results are shown in Table 1.

Example 14

In a manner similar to that of Example 1 except that an aqueous glycine solution (pH 8.0 at 25° C.) having a concentration of 5 mass % was used as the treatment liquid and the temperature of the treatment liquid was changed to 60° C., the removal step was performed and the removal rate of the tungsten oxide film was determined. The results are shown in Table 1.

Example 15

In a manner similar to that of Example 1 except that an aqueous citric acid solution (pH 2.0 at 25° C.) having a concentration of 5 mass % was used as the treatment liquid and the temperature of the treatment liquid was changed to 60° C., the removal step was performed and the removal rate of the tungsten oxide film was determined. The results are shown in Table 1.

Example 16

In a manner similar to that of Example 1 except that the kind of the film to be formed on the silicon substrate was changed to a cobalt oxide (CoO) film (product of KST WORLD, film thickness: 600 nm), the removal step was performed and the removal rate of the cobalt oxide film was determined. The results are shown in Table 1.

Example 17

In a manner similar to that of Example 1 except that the kind of the film to be formed on the silicon substrate was changed to a nickel oxide (NiO) film (product of KST WORLD, film thickness: 600 nm), the removal step was performed and the removal rate of the nickel oxide film was determined. The results are shown in Table 1.

Example 18

In a manner similar to that of Example 1 except that the kind of the film to be formed on the silicon substrate was changed to a molybdenum oxide ($MoO_3$) film (product of KST WORLD, film thickness: 600 nm), the removal step was performed and the removal rate of the molybdenum oxide film was determined. The results are shown in Table 1.

Example 19

In a manner similar to that of Example 1 except that the kind of the film to be formed on the silicon substrate was changed to a titanium oxide ($TiO_2$) film (product of KST WORLD, film thickness: 600 nm), the removal step was performed and the removal rate of the titanium oxide film was determined. The results are shown in Table 1.

Example 20

In a manner similar to that of Example 1 except that the kind of the film to be formed on the silicon substrate was changed to an iron oxide ($Fe_2O_3$) film (product of KST WORLD, film thickness: 600 nm), the removal step was performed and the removal rate of the iron oxide film was determined. The results are shown in Table 1.

Example 21

In a manner similar to that of Example 1 except that the kind of the film to be formed on the silicon substrate was changed to a copper oxide (CuO) film (product of KST WORLD, film thickness: 600 nm), the removal step was performed and the removal rate of the copper oxide film was determined. The results are shown in Table 1.

Example 22

In a manner similar to that of Example 1 except that the kind of the film to be formed on the silicon substrate was changed to a tantalum oxide ($Ta_2O_5$) film (product of KST WORLD, film thickness: 600 nm) and the temperature of the treatment liquid was changed to 60° C., the removal step was performed and the removal rate of the tantalum oxide film was determined. The results are shown in Table 1.

Example 23

In a manner similar to that of Example 1 except that the kind of the film to be formed on the silicon substrate was changed to a tantalum oxide film (product of KST WORLD, film thickness: 600 nm), an aqueous ammonium lactate solution (pH 7.8 at 25° C.) having a concentration of 5 mass % was used as the treatment liquid, and the temperature of the treatment liquid was changed to 40° C., the removal step was performed and the removal rate of the tantalum oxide film was determined. The results are shown in Table 1.

Example 24

In a manner similar to that of Example 1 except that the kind of the film to be formed on the silicon substrate was changed to a tungsten nitride ($WN_2$) film (product of KST WORLD, film thickness: 600 nm) and the temperature of the treatment liquid was changed to 60° C., the removal step was performed and the removal rate of the tungsten nitride film was determined. The results are shown in Table 1.

Example 25

In a manner similar to that of Example 1 except that the kind of the film to be formed on the silicon substrate was changed to a tungsten oxynitride (WON) film (product of KST WORLD, film thickness: 600 nm) and the temperature of the treatment liquid was changed to 60° C., the removal step was performed and the removal rate of the tungsten oxynitride film was determined. The results are shown in Table 1.

Example 26

A test was performed in a manner similar to that of Example 1 except that a silicon substrate (product of KST WORLD) having a 600-nm thick tungsten oxide film formed thereon and a silicon substrate (product of KST WORLD) having a 100-nm thick tungsten film formed thereon were dipped simultaneously in the treatment liquid and the respective removal rates of the tungsten oxide film and the tungsten film were determined. The results are shown in Table 2.

It is to be noted that the column of "removal rate" in Table 2 indicates "30/under 0.1", meaning that the removal rate of the tungsten oxide film is 30 nm/min and the removal rate of the tungsten film is under 0.1 nm/min. In other words, it indicates the respective removal rates of the two films listed in the column of "kind of film" in Table 2. This will also apply to Examples 27 and 28 and Comparative Examples 2 and 3 which will be described later.

In Table 2, the term "removal rate ratio" means a ratio of the respective removal rates of the aforesaid two films, that is, (removal rate of the film listed on the left side)/(removal rate of the film listed on the right side).

Example 27

In a manner similar to that of Example 26 except that an aqueous solution (pH 7.6 at 25° C.) obtained by mixing an aqueous triammonium citrate solution having a concentration of 5 mass % and aqueous hydrogen peroxide having a concentration of 1 mass % at a mass ratio of 1:1 was used as the treatment liquid, the removal step was performed and the respective removal rates of the tungsten oxide film and the tungsten film were determined. The treatment liquid used is an aqueous solution containing 2.5 mass % triammonium citrate and 0.5 mass % hydrogen peroxide. The results are shown in Table 2.

Example 28

A test was performed in a manner similar to that of Example 1 except that an aqueous solution (pH 7.6 at 25° C.) obtained by mixing an aqueous triammonium citrate solution having a concentration of 5 mass % and an aqueous hydrogen fluoride solution having a concentration of 1 mass % at a mass ratio of 1:1 was used as the treatment liquid and a silicon substrate (product of KST WORLD) having a 600-nm thick tungsten oxide film formed thereon and a silicon substrate (product of KST WORLD) having a 100 nm-thick silicon dioxide ($SiO_2$) film formed thereon were simultaneously dipped in the treatment liquid to determine the respective removal rates of the tungsten oxide film and the silicon dioxide film. The treatment liquid used is an aqueous solution containing 2.5 mass % triammonium citrate and 0.5 mass % hydrogen peroxide. The results are shown in Table 2.

removal step was performed and the respective removal rates of the films listed in Table 2 were determined. The results are shown in Table 2.

Comparative Example 1

In a manner similar to that of Example 1 except that the concentration of triammonium citrate in the treatment liquid was changed to 1 mass %, the removal step was performed and the removal rate of the tungsten oxide film was determined. The results are shown in Table 2.

Comparative Example 2

In a manner similar to that of Example 26 except that an aqueous solution (pH 14.0 at 25° C.) obtained by mixing aqueous ammonia having a concentration of 5 mass % and aqueous hydrogen peroxide having a concentration of 5 mass % at a mass ratio of 2:8 was used as the treatment liquid, the removal step was performed and the respective removal rates of the tungsten oxide film and the tungsten film were determined. The treatment liquid used is an aqueous solution containing 1 mass % ammonia and 4 mass % hydrogen peroxide. The results are shown in Table 2.

TABLE 2

| | | Treatment liquid | | | Treatment time | Removal rate | Removal rate |
|---|---|---|---|---|---|---|---|
| | Kind of film | Composition | pH | Temperature (° C.) | (min) | (nm/min) | ratio |
| Ex. 26 | Tungsten oxide/tungsten | 5 Mass % triammonium citrate | 7.6 | 25 | 5 | 30/under 0.1 | Over 300 |
| Ex. 27 | Tungsten oxide/tungsten | 2.5 Mass % triammonium citrate, 0.5 mass % hydrogen peroxide | 7.6 | 25 | 5 | 30/2 | 15 |
| Ex. 28 | Tungsten oxide/ silicon dioxide | 2.5 Mass % triammonium citrate, 0.5 mass % hydrogen fluoride | 7.6 | 25 | 5 | 30/2 | 15 |
| Ref. Ex. 1 | Silicon dioxide | 5 Mass % triammonium citrate | 7.6 | 25 | 180 | Under 0.1 | — |
| Ref. Ex. 2 | Silicon nitride | 5 Mass % triammonium citrate | 7.6 | 25 | 180 | Under 0.1 | — |
| Ref. Ex. 3 | Polysilicon | 5 Mass % triammonium citrate | 7.6 | 25 | 180 | Under 0.1 | — |
| Ref. Ex. 4 | Tungsten | 5 Mass % triammonium citrate | 7.6 | 25 | 180 | Under 0.1 | — |
| Ref. Ex. 5 | Cobalt | 5 Mass % triammonium citrate | 7.6 | 25 | 180 | Under 0.1 | — |
| Ref. Ex. 6 | Nickel | 5 Mass % triammonium citrate | 7.6 | 25 | 180 | Under 0.1 | — |
| Ref. Ex. 7 | Tantalum | 5 Mass % triammonium citrate | 7.6 | 25 | 180 | Under 0.1 | — |
| Ref. Ex. 8 | Iron | 5 Mass % triammonium citrate | 7.6 | 25 | 180 | Under 0.1 | — |
| Ref. Ex. 9 | Copper | 5 Mass % triammonium citrate | 7.6 | 25 | 180 | Under 0.1 | — |
| Ref. Ex. 10 | Molybdenum | 5 Mass % triammonium citrate | 7.6 | 25 | 180 | Under 0.1 | — |
| Comp. Ex. 1 | Tungsten oxide | 1 Mass % triammonium citrate | 7.3 | 25 | 60 | 2 | — |
| Comp. Ex. 2 | Tungsten oxide/tungsten | 1 Mass % ammonia, 4 mass % hydrogen peroxide | 14 | 25 | 5 | 30/50 | 0.6 |
| Comp. Ex. 3 | Tungsten oxide/ polysilicon | 0.5 Mass % citric acid, 4.5 mass % ammonia | 14 | 25 | 5 | 18/10 | 1.8 |

Referential Example 1

In a manner similar to that of Example 1 except that a silicon dioxide film (product of KST WORLD, film thickness: 100 nm) was used as the film to be formed on the silicon substrate and the treatment time was changed to 180 minutes, the removal step was performed and the removal rate of the silicon dioxide film was determined. The results are shown in Table 2.

Referential Examples 2 to 10

In a manner similar to that of Referential Example 1 except that the films listed in Table 2 (each, product of KST WORLD, each film having a film thickness of 100 nm) were used as the film to be formed on the silicon substrate, the Comparative Example 3

A test was performed in a manner similar to that of Example 1 except that an aqueous solution (pH 14.0 at 25° C.) obtained by mixing an aqueous citric acid solution having a concentration of 5 mass % and aqueous ammonia having a concentration of 5 mass % at a mass ratio of 1:9 was used as the treatment liquid and a silicon substrate (product of KST WORLD) having a 600-nm thick tungsten oxide film formed thereon and a silicon substrate (product of KST WORLD) having a 100-nm thick polysilicon film formed thereon were simultaneously dipped in the treatment liquid to determine the respective removal rates of the tungsten oxide film and the polysilicon film. The treatment liquid used is an aqueous solution containing 0.5 mass % citric acid and 4.5 mass % ammonia. The results are shown in Table 2.

As is apparent from the results of Examples 1 to 4, using an aqueous triammonium citrate solution as the treatment liquid allows the removal of tungsten oxide at a practical rate. In addition, with an increase in the temperature of the treatment liquid, the removal rate increases and with an increase in the concentration of triammonium citrate in the treatment liquid, the removal rate increases.

As is apparent from the results of Example 1 and Examples 5 to 7, as the pH at 25° C. of the treatment liquid is higher, the removal rate is better, which is presumed to occur because the protonation of citric acid ions is suppressed and the concentration of the chelate species is enhanced by keeping the pH at 25° C. of the treatment liquid high.

As is apparent from the results of Examples 8 to 15, the removal of tungsten oxide proceeds without a problem even by using, as the compound for removal, trisodium citrate, tripotassium citrate, ammonium DL-tartrate, diammonium succinate, diammonium malate, diammonium glutarate, glycine, or citric acid.

As is apparent from the results of Examples 16 to 25, the oxides of various metals, nitride of a metal, and oxynitride of a metal can be removed using triammonium citrate or ammonium lactate as the compound for removal. In particular, the removal of tantalum oxide proceeded more speedily by using ammonium lactate as the compound for removal than by using triammonium citrate. This has suggested that it is effective to change the kind of the carboxylic acid to be used in the treatment liquid, depending on the kind of the metal of a metal compound which is a removal object.

As is apparent from the results of Example 26, when tungsten oxide and a simple substance of tungsten are treated simultaneously in the aqueous triammonium citrate solution, tungsten oxide is removed selectively.

As is apparent from the results of Example 27, when tungsten oxide and a simple substance of tungsten are treated simultaneously in the aqueous triammonium citrate solution containing trace amounts of hydrogen peroxide, the simple substance of tungsten is removed slightly and tungsten oxide is removed selectively.

As is apparent from the results of Example 28, when tungsten oxide and silicon dioxide are treated simultaneously in the aqueous triammonium citrate solution containing trace amounts of a fluoride ion, silicon dioxide is removed slightly and tungsten oxide is removed selectively.

As is apparent from the results of Referential Examples 1 to 10, the silicon-based material or the simple substance of a metal was hardly removed under conditions using an aqueous triammonium citrate solution having a concentration of 5 mass %.

As is apparent from the results of Comparative Example 1, tungsten oxide was removed but its removal rate was low under conditions using an aqueous triammonium citrate solution having a concentration of 1 mass % was used as the treatment liquid. This has suggested that the concentration of a carboxylic acid in the treatment liquid in the present invention has a marked influence on the removal effect of a metal compound.

As is apparent from the results of Comparative Example 2 and Comparative Example 3, when a mixed solution of aqueous ammonia and aqueous hydrogen peroxide and a mixed solution (having a citric acid concentration of less than 2 mass %) of an aqueous citric acid solution and aqueous ammonia were used as the treatment liquid, respectively, tungsten oxide was removed but the removal of the simple substance of tungsten and polysilicon proceeded simultaneously, leading to a reduction in selectivity.

The invention claimed is:

1. A method for removing a metal compound, comprising bringing at least one metal compound selected from oxides of a metal, nitrides of a metal, and oxynitrides of a metal into contact with a treatment liquid to remove the metal compound from a treatment object, wherein:
the metal is at least one selected from tungsten, cobalt, nickel, tantalum, titanium, iron, and molybdenum,
the treatment liquid is an aqueous solution consisting of water and at least one compound for removal selected from carboxylic acids and salts of the carboxylic acids, and
the treatment liquid contains the at least one compound for removal at a total concentration of 2 mass % or more.

2. The method for removing a metal compound according to claim 1, wherein the carboxylic acids are polycarboxylic acids.

3. The method for removing a metal compound according to claim 1, wherein the carboxylic acids are α-hydroxycarboxylic acids.

4. The method for removing a metal compound according to claim 1, wherein the carboxylic acids are α-amino acids.

5. The method for removing a metal compound according to claim 1, wherein the carboxylic acids are at least one selected from citric acid, tartaric acid, succinic acid, malic acid, glutaric acid, lactic acid, and glycine.

6. The method for removing a metal compound according to claim 1, wherein the at least one compound for removal contains at least one selected from ammonium salts of the carboxylic acids, sodium salts of the carboxylic acids, and potassium salts of the carboxylic acids.

7. The method for removing a metal compound according to claim 1, wherein the treatment liquid has a pH at 25° C. of 1 or more and 9 or less.

8. The method for removing a metal compound according to claim 1, wherein the treatment liquid has a temperature of 0° C. or more and 100° C. or less.

9. The method for removing a metal compound according to claim 1, wherein a contact time between the at least one metal compound and the treatment liquid is 1 second or more to 60 minutes or less.

10. The method for removing a metal compound according to claim 1, wherein a ratio of a removal rate of the at least one metal compound as a removal object to a removal rate of a non-removal object is 10 or more and the non-removal object is at least one selected from silicon dioxide, silicon nitride, polysilicon, a simple substance of tungsten, a simple substance of cobalt, a simple substance of nickel, a simple substance of tantalum, a simple substance of titanium, a simple substance of iron, a simple substance of copper, and a simple substance of molybdenum.

11. The method for removing a metal compound according to claim 1, wherein the at least one metal compound is a contaminant for an electronic device.

12. The method for removing a metal compound according to claim 1, wherein the treatment liquid contains the at least one compound for removal at the total concentration of 3 mass % or more and 70 mass % or less.

13. The method for removing a metal compound according to claim 12, wherein the carboxylic acids are polycarboxylic acids.

14. The method for removing a metal compound according to claim 12, wherein the carboxylic acids are α-hydroxycarboxylic acids.

15. The method for removing a metal compound according to claim 1, wherein the treatment liquid contains the at least one compound for removal at the total concentration of 5 mass % or more and 50 mass % or less.

16. The method for removing a metal compound according to claim 15, wherein the carboxylic acids are polycarboxylic acids.

17. The method for removing a metal compound according to claim 15, wherein the carboxylic acids are α-hydroxycarboxylic acids.

* * * * *